Patented Nov. 15, 1932

1,888,118

UNITED STATES PATENT OFFICE

KARL FREDENHAGEN, OF GREIFSWALD, GERMANY

PRODUCTION OF FLUORINE

No Drawing. Application filed July 11, 1929, Serial No. 377,607, and in Germany July 17, 1928.

The present invention relates to the electrolytic production of fluorine.

In the said production of fluorine from alkali metal bifluoride melts, graphite or carbon electrodes can be used. If, however, solutions of alkali metal fluoride in hydrofluoric acid are used as the electrolyte instead of fused alkali metal bifluorides, neither graphite nor carbon can be used as material for the anodes, since they are readily destroyed during the electrolysis. For the electrolysis of such solutions or melts therefore metallic electrodes have hitherto been used. These electrodes have the disadvantage that the tension required for the production of fluorine is comparatively high and that they are also attacked to a more or less considerable degree.

I have now found that melts of acid alkali metal fluorides containing an excess of hydrogen fluoride over the amount present in alkali metal bifluoride, that is solutions of alkali metal fluorides in hydrogen fluoride which contain more than 1 molecular proportion of hydrogen fluoride per each molecular proportion of alkali metal fluoride can be subjected to electrolysis with carbon electrodes, provided the content of the said solutions in hydrogen fluoride is below that at which the carbon electrodes are wetted by the melt. The term "carbon electrodes" is used in a broad sense including not only electrodes made from pure carbon, but also such as are prepared from natural or artificial graphite. In the case of potassium fluoride, for example, the electrolysis can be carried out successfully by means of carbon electrodes, if so much hydrogen fluoride is present that the melt contains not more than 1.8 molecular proportions of hydrogen fluoride per each molecular proportion of potassium fluoride. Only with a higher content in hydrogen fluoride than indicated, the carbon electrodes are wetted and are destroyed during the electrolysis. By the process according to the present invention it is possible to vary considerably the composition of the melt and also the yield of fluorine obtainable from a given amount of electrolyte while making use of the low voltage possible with carbon electrodes and of the high stability of this electrode material. Further, with the electrolytes according to the present invention the temperature may be lower, for example about 200° C., than in the case of melts of pure alkali metal bifluorides where temperatures of about 240° C. are required.

The following example will further illustrate the nature of this invention which, however, is not limited thereto.

Example

When an anhydrous potassium bifluoride melt containing 2.2 molecular proportions of hydrogen fluoride per each molecular proportion of potassium fluoride is subjected to electrolysis with the aid of anodes of copper or nickel, the decomposing voltage is more than 30 volts and the metallic anodes are strongly corroded. When a melt of the said kind is subjected to electrolysis by means of graphite anodes, the voltage is considerably lower, but the anodes are rapidly destroyed. It has been found that this is not due to a chemical attack of the graphite, but to mechanical destruction resulting from the property of the melt of wetting the graphite, causing the disengagement of fluorine to take place also in the interior of the electrodes. Potassium bifluoride melts containing less than 1.8 molecular proportions of hydrogen fluoride per each molecular proportion of potassium fluoride do not wet the graphite electrodes and with such melts the production of fluorine can be carried out without the graphite electrodes being destroyed. For example, with a melt containing 1.7 molecular proportions of hydrogen fluoride per each molecular proportion of potassium fluoride, the electrolysis can be carried out with the aid of graphite anodes at a temperature of about 200° C. and 8 volts and with a current density of more than 0.2 ampere per square centimeter, without the graphite anodes being attacked or destroyed to any substantial extent. Electrodes of pure carbon behave quite similarly, only the limit at which they begin to be wetted by the electrolyte being slightly different.

What I claim is:

The process of producing fluorine which comprises subjecting a substantially anhydrous solution of potassium bifluoride in hydrogen fluoride which contains more than 1 but not more than 1.8 molecular proportion of hydrogen fluoride to each molecular proportion of potassium fluoride to electrolysis.

In testimony whereof I have hereunto set my hand.

KARL FREDENHAGEN.